Sept. 24, 1946.　　　W. E. SHOUPP　　　2,408,230
MEASURING APPARATUS
Filed Dec. 9, 1941
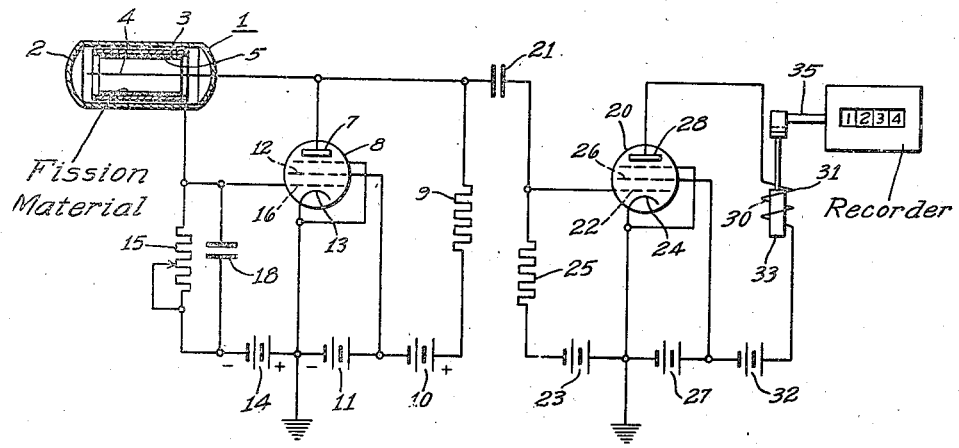
WITNESSES:
INVENTOR
William E. Shoupp.
BY
ATTORNEY Patented Sept. 24, 1946

2,408,230

UNITED STATES PATENT OFFICE 2,408,230

MEASURING APPARATUS

William E. Shoupp, Pittsburgh, Pa., assignor to Westinghouse Electric Corporation, East Pittsburgh, Pa., a corporation of Pennsylvania Application December 9, 1941, Serial No. 422,271

11 Claims. (Cl. 250—83.6)

This invention relates to measuring apparatus and, more particularly, to devices for indicating the presence of corpuscular radiation.

Radioactive substances form a source of radiations of particles, the presence of which may be indicated by suitable sensitive devices which respond to the electrical charges carried by such particles. In the atomic disintegration, we find that in the atomic structure there are particles which do not possess an electrical charge of any kind. These particles are defined as neutrons. As this definition indicates, these particles are neutral and will not be attracted by electrical fields, and their presence will not change the potential charge-equilibrium of matter with which they may come into contact. The methods heretofore used for indicating charged particles, therefore, cannot be applied for indicating the presence of neutron radiation.

The present invention has for its object to indicate the presence of neutron particles and also count the number of such particles within a confined space.

A particular feature of the invention is that the phenomenon of atomic fission observable in nuclear physics is utilized as a secondary effect producing medium for the indication of neutron radiation. A particular advantage in utilizing atomic fission is that apparatus used to detect particles having a definite electrical charge may be employed, with simple modification in accordance with this invention, to indicate neutron radiation.

Other features and advantages will be apparent from the following description of the invention, pointed out in particularity by the appended claims, and taken in connection with the accompanying drawing, in which:

The figure shows schematically the circuit of a counting and recording apparatus responsive to neutron particles.

Referring to the figure, a counter tube 1 is shown schematically in cross-section comprising a suitable housing 2 of glass or other material within which is a conducting cylinder 3. Coaxially to this cylinder is stretched a fine insulated wire 4. The counter tube just described is known in the art as a "Geiger counter," and is used in connection with suitable electrical apparatus to respond to the presence of charged particles which will produce ionization between the conducting cylinder and the insulated wire. However, since neutrons are particles devoid of electrical charge, they will not produce ionization in the counter tubes known in the art. In accordance with this invention, the counter tube is modified by adding to its elements recited a coating 5 to the inner wall of the cylinder 3 of such material which is capable of atomic fission in the presence of neutron particles. Uranium or thorium, among other elements, are particularly disrupted by neutron bombardment. Neutrons penetrate glass and similar materials, and, therefore, the envelope 2 offers no impediment to their passage. The nuclear disintegration produced by the fission of the uranium or thorium atoms results in the formation of new nuclei possessing strong ionization properties which will ionize the space within the counter tube.

These new nuclei or fission particles resulting from the neutrons striking the uranium or thorium cause very high ionization, so that the voltage difference between the electrodes of the counter tube may be set sufficiently low as to make the counter respond only to radiation due to nuclear fission and not to any other corpuscular radiations, such as alpha or beta rays, or electrons that may be present. The fission, and consequently the registered counts, will then be a measure of the neutron intensity. Generally, in counter tubes, once ionization starts the electrons formed in the ionized gaseous atmosphere in their acceleration form more electrons, creating an electron avalanche. If the discharge is to be self-maintained, it requires a source of electrons other than that of the gas molecules. It was found that the source of these electrons is the photoelectrons ejected from the cylinder 3 by the quanta that radiate from the excited positive ions formed by the electrons that set up the avalanche. For this reason, once a discharge is started in the counter tube, means must be provided for extinguishing it rapidly in order to bring the tube to a sensitive condition for the next neutron particle. It is important to note that the neutron induced fission is much more probable than the fission which may be induced by gamma rays, and no serious correction will be necessary in the apparatus in accordance with this invention to cancel the effect which gamma rays may produce.

Coupled to the counter tube 1 is a vacuum tube circuit shown here in a simplified form reduced to the essential elements of an operating structure. For the sake of simplicity, individual batteries are shown as the sources of operating potentials for the tubes and for the counter tube. It is, of course, understood that these batteries may be replaced by a suitable power supply operating from commercial power circuits. The tubes used are shown to be of the cathode-heater type, the filament circuit being omitted, since it is well known that the cathodes are heated by filaments which may receive energy from various types of sources of current. The wire 4 is connected to the anode 7 of the tube 8 and also to the anode load resistor 9, which terminates at the positive terminal of the battery 10. The battery 11 is connected in series therewith, and the screen grid electrode 12 of the tube 8 is supplied with potential from the battery 11, in that the screen grid 12 is connected to the junction point between the two batteries. The cathode 13 connects to the negative terminal of the battery 11 and also to the positive terminal of the battery 14. The latter is in series with the resistor 15 which connects to the control grid 16 of the tube 8 and also to the cylinder 3 of the counter tube 1. In parallel with the resistor 15 is the condenser 18.

The output of the tube 8 between anode and cathode is coupled to the input circuit of the amplifier tube 20 by means of the coupling condenser 21 which connects to the grid 22 of the tube 20. The biasing potential of the grid 22 is derived from the battery 23 between cathode 24 in series with the grid load resistance 25. The amplifier tube 20 is also of the screen grid type having a screen grid 26 which is supplied with operating potential from the battery 27. The anode 28 of the tube 20 connects to the operating winding 30 of the electromagnet 31, and is supplied with operating potential from the battery 32 in series with the battery 27. The plunger 33 of the electromagnet 31 is mechanically linked with the shaft 35 of a recording device. The latter operates in the well known manner that for each movement of the shaft 35 caused by the plunger 33 a number will appear, whereby every movement of the shaft is successively indicated within the number range that the recording device may have.

Referring to the operation of the circuit, the counter tube is usually operated at a pressure of a few centimeters of gas. A polarizing voltage of a potential positive with respect to the cylinder is applied to the wire 4 from the batteries 14, 11, and 10 in series. In following the circuit, it is seen that the extreme negative terminal of the series combination of batteries connects through the resistor 15 to the cylinder 3, whereas the extreme positive terminal is connected through the anode resistor 9 to the wire 4. The voltage produced by the batteries is of such magnitude that it will not break down the gap between the wire 4 and the cylinder 3. When the fission material coating 5 is exposed to neutron particles, the fission of the material, as stated above, produces fission particles which liberate electrons and ions in the gas so that an electrical discharge occurs between the wire and the cylinder. The strong electric field near the wire will obtain sufficient energy to ionize the gas. The ionization permits electrical conductivity between the wire 4 and the cylinder 3. When this happens, the grid 16 of the tube 8 will become positive and the resultant current produces a voltage drop across resistor 9. The change of voltage across resistor 9 is transmitted to the grid 22 of the amplifier tube 20 by the discharge of the condenser 21. The impulse which the grid 22 receives is then amplified by the tube 20 and results in a plate current change. The plate current flowing through the winding 30 will cause the plunger 33 to operate and move the shaft 35 of the recorder.

A breakdown in the counter tube, as stated before, would maintain conductivity if the applied voltage between the cylinder 3 and the wire 4 is not removed. However, the circuit components are so proportioned that the voltage drop due to anode current of the tube 8 is sufficiently high to lower the potential difference between the cylinder 3 and the wire 4 to a value which removes the initial potential between these elements for maintaining ionization. In other words, the tube 8 acts as a low resistance, short-circuiting the counter tube elements and the discharge in the counter tube will be extinguished. As soon as there is no conductivity, the grid 16 of the tube 8 returns to its normal negative charge, and anode current in the tube ceases. The voltage equilibrium is again restored between the cylinder 3 and the wire 4 to a high value for the next ionization due to fission of the deposit. The rate of conductive energization and restoration to non-conductivity is determined by the time constant of the resistor 15 and the capacity 18.

I claim as my invention:

1. In a counter for indicating neutron particles, a counter tube including a pair of discharge electrodes in a gaseous atmosphere, material capable of atomic fission under neutron bombardment, thereby liberating radiation causing ionization of said atmosphere, associated with one of said electrodes, and an ionization responsive circuit connected between said electrodes.

2. In a counter for indicating the intensity of neutrons, a counter tube exposed to neutron radiation, a pair of discharge electrodes in a gaseous atmosphere for said tube, one of which is at a positive potential with respect to the other, material capable of atomic fission under neutron bombardment, thereby liberating radiation causing ionization of said atmosphere, associated with said negatively charged electrode, and an ionization responsive circuit connected between said electrodes.

3. A counter in accordance with claim 2 in which said material is in the form of a coating of uranium.

4. A counter in accordance with claim 2 in which said material is in the form of a coating of thorium.

5. A discharge device comprising an elongated conductor in a gaseous atmosphere, a cylindrical conductor encircling said elongated conductor and a coating of a material capable of atomic fission under neutron bombardment, thereby liberating radiation causing ionization of said atmosphere, on the inner surface of said cylindrical conductor.

6. A discharge device comprising an inner conductor in a gaseous atmosphere, an outer conductor encircling said inner conductor and a coating of a material capable of atomic fission under neutron bombardment, thereby liberating radiation causing ionization of said atmosphere, on the inner surface of said outer conductor.

7. A discharge device comprising a gas-tight envelope of a material that is penetrated by neutrons, said envelope having therein an attenuated gaseous medium, an inner conductor, an outer conductor encircling said inner conductor and a coating of a material capable of atomic fission under neutron bombardment, thereby liberating radiation causing ionization of said atmosphere, on the inner surface of said outer conductor.

8. In combination, a gas-tight tube including a gaseous atmosphere and a pair of discharge electrodes, one of said electrodes bearing a material capable of atomic fission under neutron bombardment, thereby liberating radiation causing ionization of said atmosphere, a circuit interconnecting said electrodes comprising a source of direct-current voltage in series with a high impedance connected between said electrodes, and means responsive to the magnitude of current flow through said impedance.

9. In combination, a gas-tight tube including a gaseous atmosphere and a pair of discharge electrodes, one of said electrodes being a substance chosen from the group comprising uranium and thorium, a circuit interconnecting said electrodes comprising a source of direct-current voltage in series with a high impedance connected between said electrodes, and means responsive to the magnitude of current flow through said impedance.

10. In combination, a gas-tight tube including a gaseous atmosphere and a pair of discharge electrodes, one of said electrodes being a material capable of atomic fission under neutron bombardment, thereby liberating radiation causing ionization of said atmosphere, a tube having a control electrode and two principal electrodes, said control electrode being connected to one of the first-mentioned electrodes, an impedance interconnecting said control electrode with one of said principal electrodes, a second impedance and a source of direct-current voltage interconnecting said one of said principal electrodes to the other of said principal electrodes, said other of said principal electrodes being connected to the other of said first-mentioned pair of electrodes, and current-indicating means responsive to current flow between said principal electrodes.

11. In combination, a gas-tight tube including a gaseous atmosphere and a pair of discharge electrodes, one of said electrodes being a substance chosen from the group comprising uranium and thorium, a tube having a control electrode and two principal electrodes, said control electrode being connected to one of the first-mentioned electrodes, an impedance interconnecting said control electrode with one of said principal electrodes, a second impedance and a source of direct-current voltage interconnecting said one of said principal electrodes to the other of said principal electrodes, said other of said principal electrodes being connected to the other of said first-mentioned pair of electrodes, and current-indicating means responsive to current flow between said principal electrodes.

WILLIAM E. SHOUPP.